(12) United States Patent
Schnetzka et al.

(10) Patent No.: US 10,340,829 B2
(45) Date of Patent: Jul. 2, 2019

(54) ELECTRICAL POWER CIRCUIT AND METHOD OF OPERATING SAME

(71) Applicant: General Electric Company, Schenectady, NY (US)

(72) Inventors: Harold Robert Schnetzka, Simpsonville, SC (US); Anthony Michael Klodowski, Hardy, VA (US); Sidney Allen Barker, Troutville, VA (US)

(73) Assignee: General Electric Company, Schenectady, NY (US)

( * ) Notice: Subject to any disclaimer, the term of this patent is extended or adjusted under 35 U.S.C. 154(b) by 136 days.

(21) Appl. No.: 15/218,121

(22) Filed: Jul. 25, 2016

(65) Prior Publication Data
US 2018/0026563 A1    Jan. 25, 2018

(51) Int. Cl.
*F03D 7/00* (2006.01)
*H02P 9/48* (2006.01)
(Continued)

(52) U.S. Cl.
CPC ............... *H02P 9/48* (2013.01); *F03D 7/028* (2013.01); *F03D 7/042* (2013.01); *F03D 9/255* (2017.02);
(Continued)

(58) Field of Classification Search
CPC .......... F03D 7/028; F03D 7/042; F03D 9/003; H02P 9/48; H02P 9/007; H02P 25/184
(Continued)

(56) References Cited

U.S. PATENT DOCUMENTS 4,477,760 A * 10/1984 Kuznetsov ............... H02P 25/20
                                                            318/771
7,352,076 B1 * 4/2008 Gabrys ................... F03D 3/005
                                                            290/44
(Continued)

FOREIGN PATENT DOCUMENTS

EP    0 821 467 A1    1/1998
EP    2 717 432 A1    4/2014
(Continued)

OTHER PUBLICATIONS

Stevanovic, et al., Industrial Readiness of SiC Power Devices, GE Global Research Center; CFES Annual Conferencel; Power Point Presentation, Feb. 26, 2015, 18 pages https://www.rpi.edu/dept/cfes/AnnualConference/b2%20Stevanoic%20GE.pdf.
(Continued)

*Primary Examiner* — Julio C. Gonzalez
(74) *Attorney, Agent, or Firm* — Dority & Manning, P.A.

(57) ABSTRACT

The present subject matter is directed to an electrical power circuit connected to a power grid and method of operating same. The electrical power circuit has a power converter electrically coupled to a generator, such as a doubly-fed induction generator, having a rotor and a stator. Thus, the method includes operating rotor connections of the rotor of the generator in a wye configuration during a first rotor speed operating range. Further, the method includes monitoring a rotor speed of the rotor of the generator. Thus, the method also includes transitioning the rotor connections of the rotor from the wye configuration to a delta configuration if the rotor speed changes to a second rotor speed operating range.

17 Claims, 7 Drawing Sheets

(51) Int. Cl.
*F03D 7/02* (2006.01)
*F03D 7/04* (2006.01)
*H02K 3/28* (2006.01)
*H02P 9/00* (2006.01)
*H02P 25/18* (2006.01)
*F03D 9/25* (2016.01)
*H02P 101/15* (2016.01)
*H02P 103/20* (2016.01)
*H02P 103/10* (2016.01)

(52) U.S. Cl.
CPC .............. *H02K 3/28* (2013.01); *H02P 9/007* (2013.01); *H02P 25/184* (2013.01); *F03D 7/0272* (2013.01); *F03D 7/0276* (2013.01); *H02K 2213/09* (2013.01); *H02P 2101/15* (2015.01); *H02P 2103/10* (2015.01); *H02P 2103/20* (2015.01); *Y02E 10/725* (2013.01)

(58) Field of Classification Search
USPC .............................. 290/44, 55; 700/286, 287
See application file for complete search history.

(56) References Cited

U.S. PATENT DOCUMENTS

| | | | |
|---|---|---|---|
| 8,570,003 B2 | 10/2013 | Lu et al. | |
| 8,853,876 B1 | 10/2014 | Wagoner et al. | |
| 9,041,234 B2 | 5/2015 | Lu et al. | |
| 9,083,220 B2 | 7/2015 | Neumann et al. | |
| 2005/0179331 A1 | 8/2005 | Maddalena | |
| 2010/0320863 A1* | 12/2010 | Nishimura | H02K 3/28 310/198 |
| 2011/0140421 A1* | 6/2011 | Scholte-Wassink | H02K 3/28 290/44 |
| 2012/0262129 A1 | 10/2012 | Lu et al. | |
| 2013/0249501 A1 | 9/2013 | Lu et al. | |
| 2014/0265596 A1 | 9/2014 | Yuan et al. | |
| 2014/0306583 A1* | 10/2014 | Moller | H02H 7/06 310/68 C |
| 2015/0026964 A1 | 1/2015 | Neumann et al. | |
| 2015/0026965 A1 | 1/2015 | Neumann et al. | |
| 2015/0028703 A1 | 1/2015 | Neumann et al. | |
| 2015/0059163 A1 | 3/2015 | Neumann et al. | |
| 2015/0101180 A1 | 4/2015 | Neumann et al. | |
| 2015/0145554 A1 | 5/2015 | Moldenhauer et al. | |
| 2015/0162905 A1 | 6/2015 | Wagoner et al. | |
| 2015/0229257 A1 | 8/2015 | Lu et al. | |
| 2016/0208781 A1* | 7/2016 | KJ R | F03D 7/0272 |
| 2017/0272015 A1* | 9/2017 | Klodowski | H02P 9/008 |

FOREIGN PATENT DOCUMENTS

| | | |
|---|---|---|
| EP | 3 034 868 A1 | 6/2016 |
| WO | WO2015043602 A1 | 4/2015 |

OTHER PUBLICATIONS

Asai, et al., Evaluation of SiC Power Diodes against Terrestrial Neutron-Induced Failure at Ground Level Failure at Ground Level, JAXA Special Publication JAXA-SP-12-008E, pp. 162-165 https://repository.exst.jaxa.jp/dspace/bitstream/a-is/16323/1/61889035.pdf.

Dodge, Reduce Circuit Zapping From Cosmic Radiation, Power Electronics Technology Magazine, Sep. 2007, pp. 20-26 http://powerelectronics.com/site-files/powerelectronics.com/files/archive/powerelectronics.com/mag/709PET21.pdf.

Dayaratne, Investigation of variable DC link voltage operation of a PMSG based win turbine with fully rated converters at steady state, Power Electronics and Applications (EPE 2011), Proceedings of the 2011-14$_{th}$ European Conference, Aug. 30, 2011-Sep. 1, 2011, pp. 1-10 http://ieeexplore.iee.org/xpl/login.jsp?tp+&arnumber +6020533&url+http%3A%2F%2Fieeexplore.ieee.org%2Fxpls%2Fabs_all.jsp%3Farnumber%3D6020533.

Extended European Search Report and Opinion issued in connection with corresponding EP Application No. 7179970.3 dated Dec. 1, 2017.

\* cited by examiner

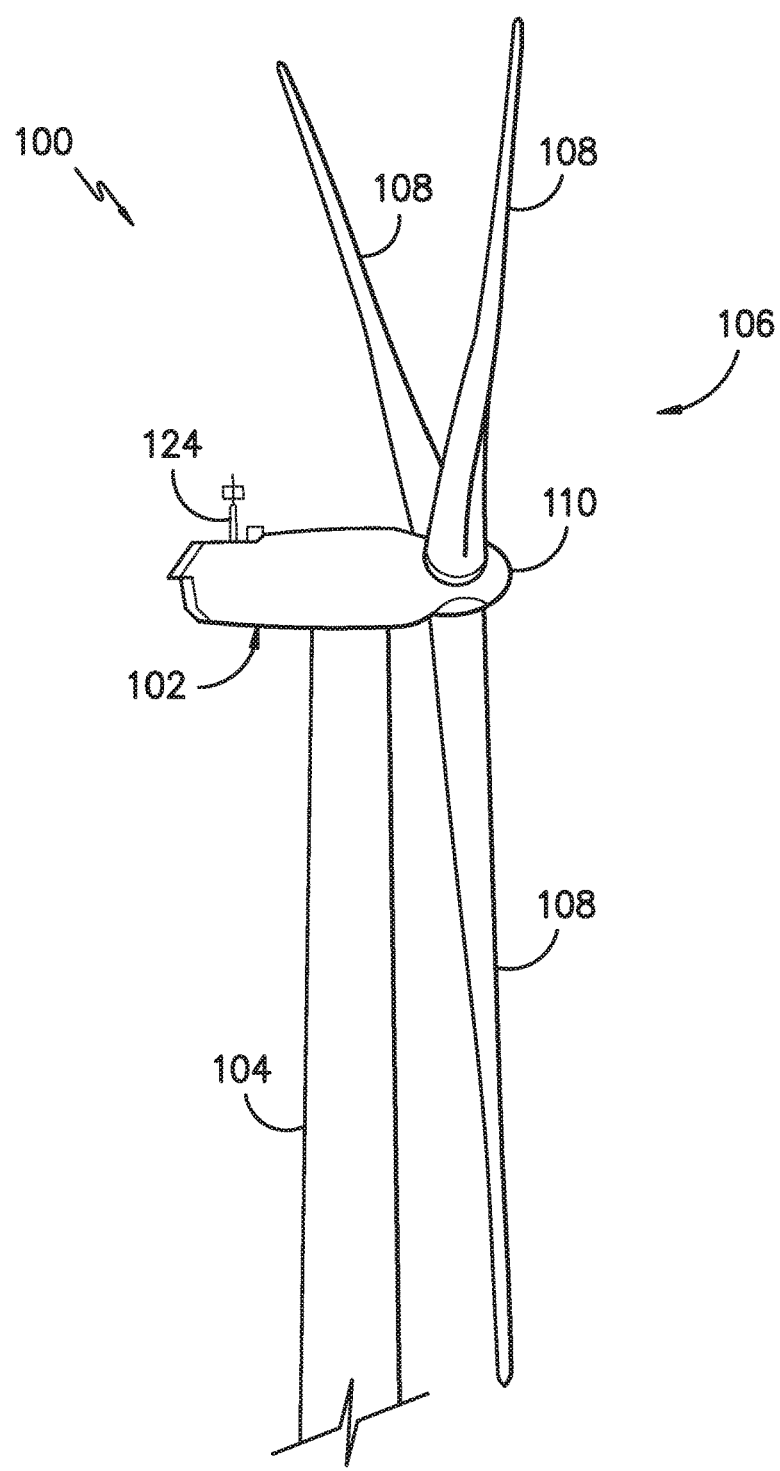
FIG. -1-

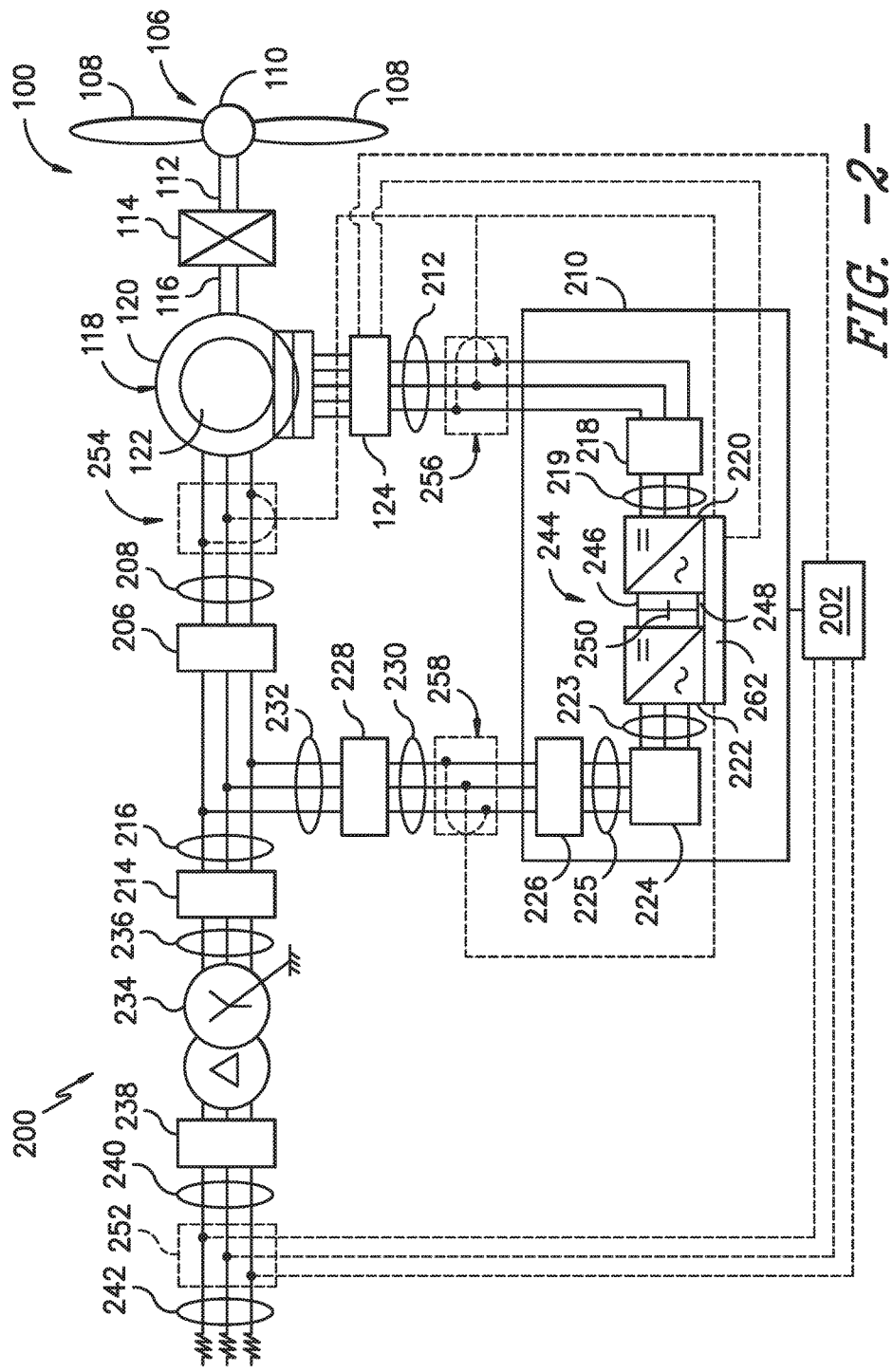
FIG. -2-

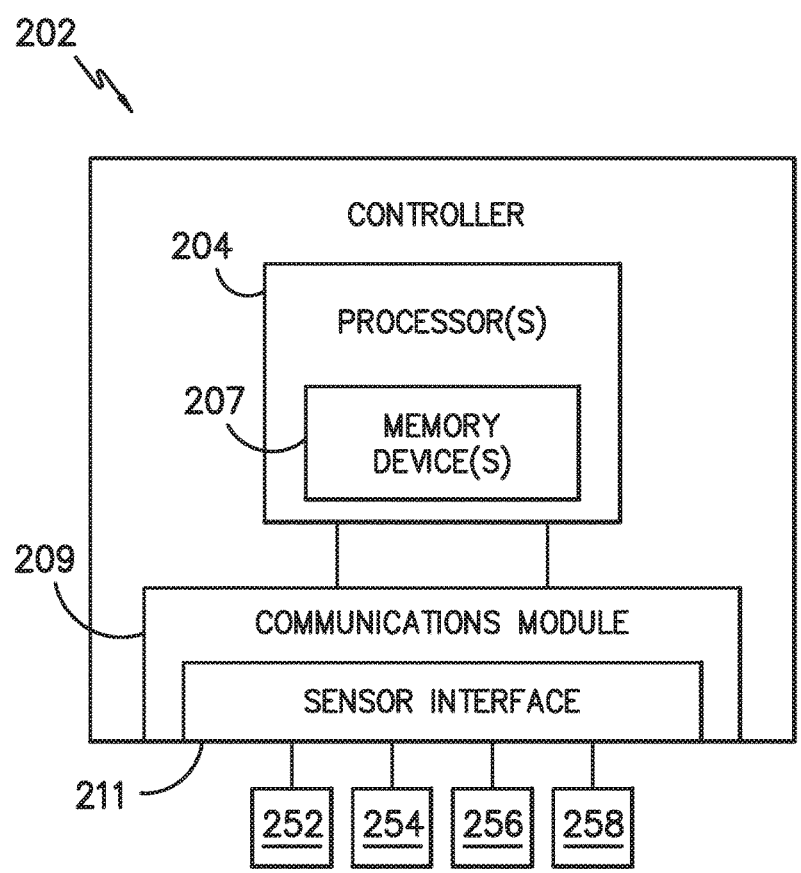
FIG. -3-

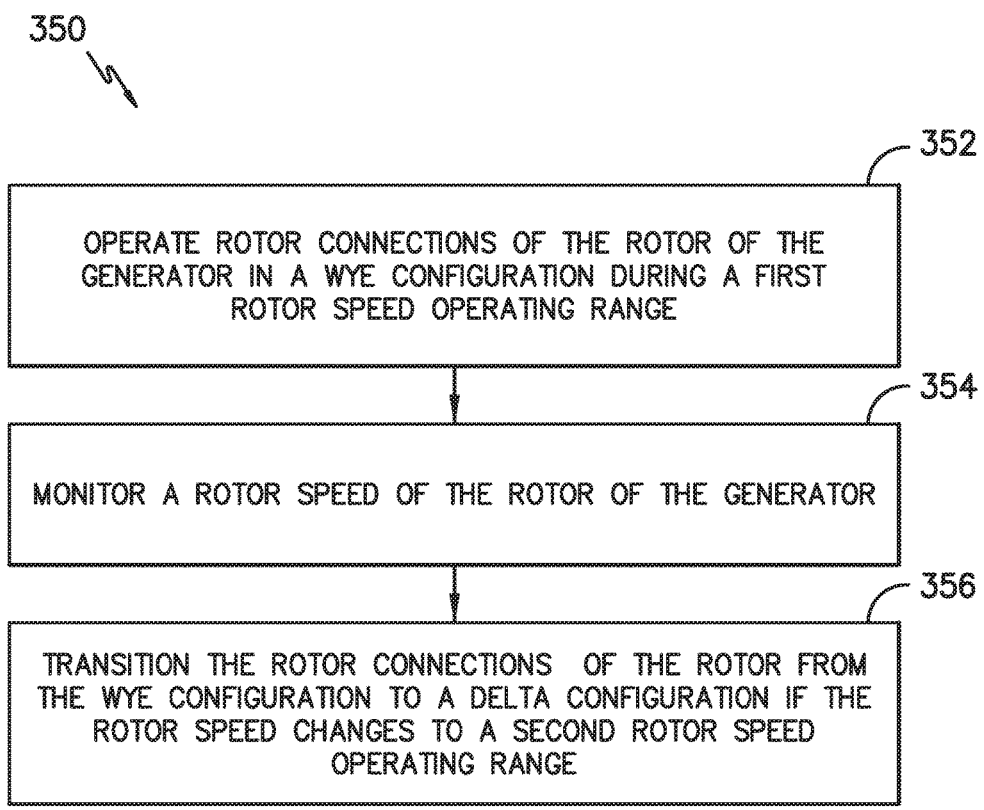
FIG. -4-

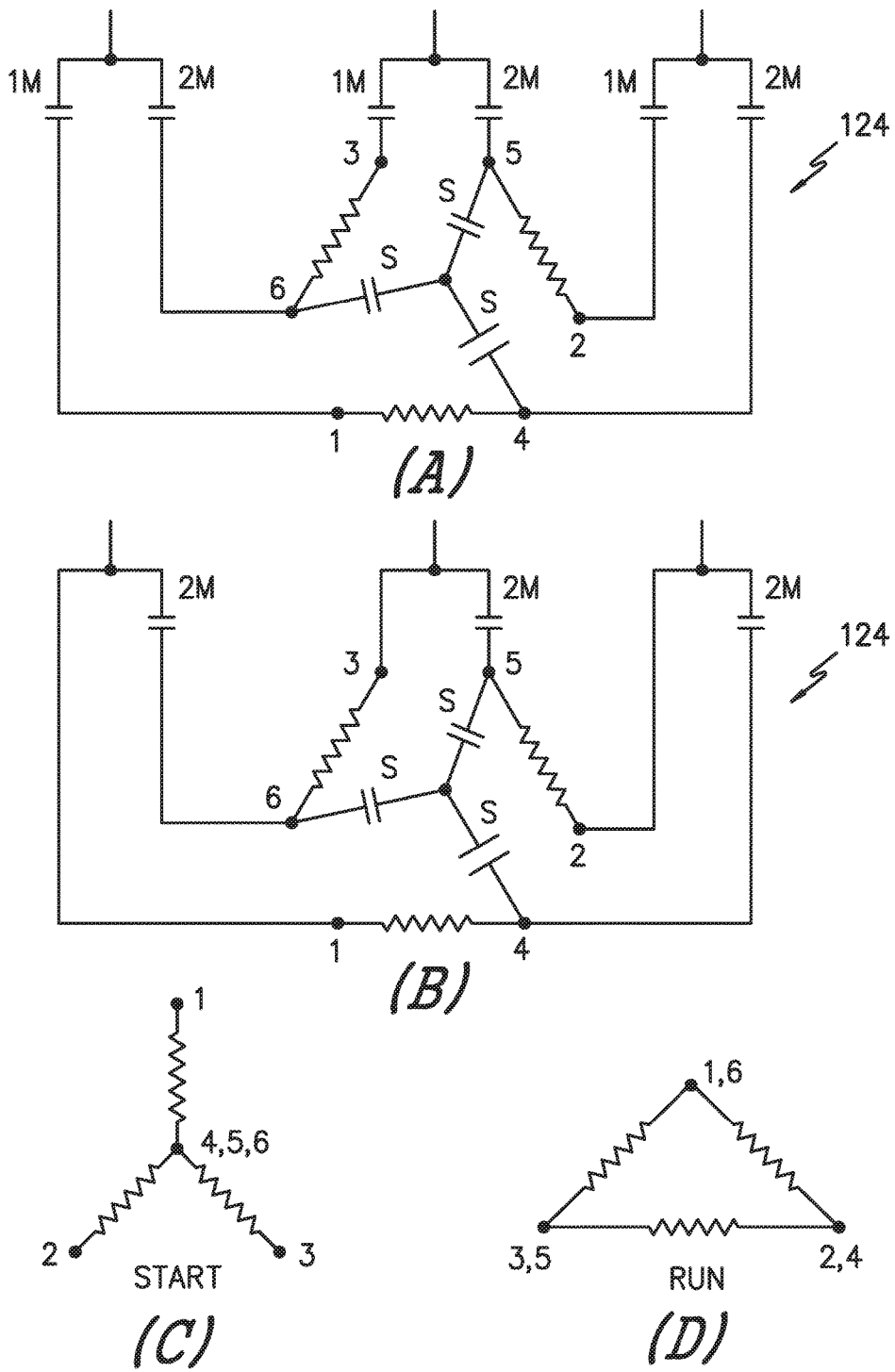
FIG. -5-

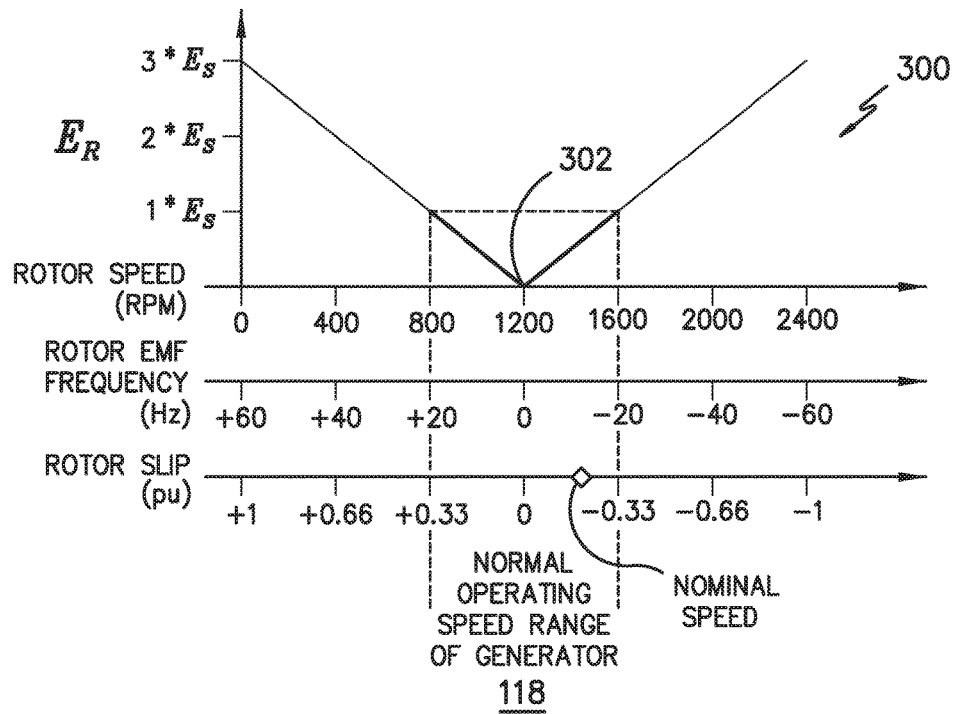
FIG. -6-
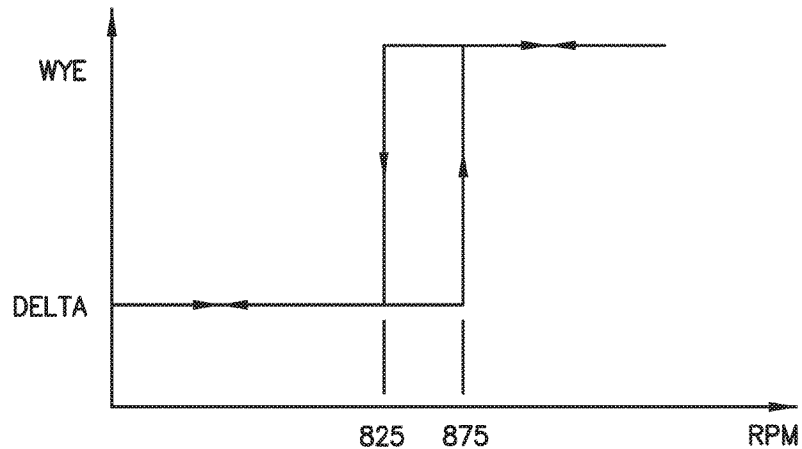
FIG. -7-

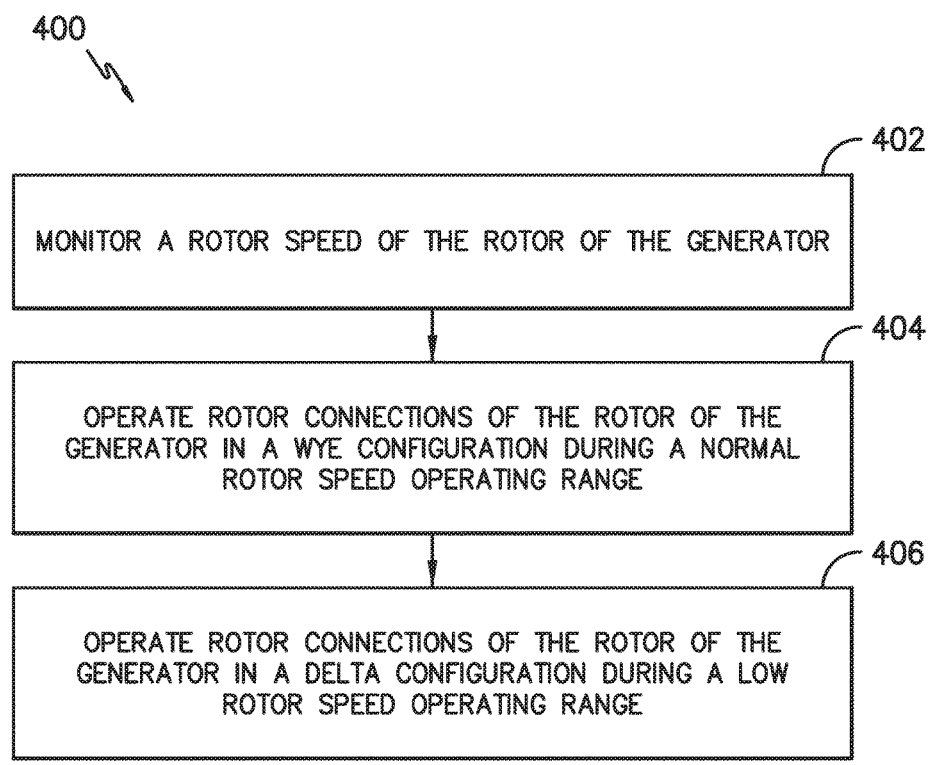
FIG. -8-

ELECTRICAL POWER CIRCUIT AND METHOD OF OPERATING SAME

FIELD OF THE INVENTION

The present disclosure relates generally to wind turbines and, more particularly, to an electrical power circuit, such as a wind turbine electrical power circuit, and method of operating same so as to increase a rotor speed operating range thereof.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. The associated electrical power can be transmitted to a main transformer that is typically connected to a power grid via a grid breaker. Thus, the main transformer steps up the voltage amplitude of the electrical power such that the transformed electrical power may be further transmitted to the power grid.

In many wind turbines, the generator rotor may be electrically coupled to a bi-directional power converter that includes a rotor-side converter joined to a line-side converter via a regulated DC link. More specifically, some wind turbines, such as wind-driven doubly-fed induction generator (DFIG) systems or full power conversion systems, may include a power converter with an AC-DC-AC topology. Standard power converters typically include a bridge circuit, a power filter, and an optional crowbar circuit. The bridge circuit typically includes a plurality of cells, for example, one or more power switching elements and/or one or more diodes.

When the wind turbine is operating within a low rotor speed operating range, the Annualized Energy Production (AEP) is reduced due to the off-line/zero production time periods of the wind turbine. As such, it would be beneficial to increase the operating RPM (rotations per minute) range of the wind turbine so as to reduce such off-line/zero production time periods so as to increase the AEP and reduce the levelized cost of electricity with minimal risk and cost.

Thus, a system and method for operating the wind turbine power system that allows for more opportunities to harness the wind energy when operating at low RPM levels would be welcomed in the art. Accordingly, the present disclosure is directed to a system and method for operating the wind turbine power system to increase a rotor speed operating range thereof so as to address the aforementioned issues.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for operating an electrical power circuit connected to a power grid. The electrical power circuit has a power converter electrically coupled to a generator having a rotor and a stator. Thus, the method includes operating rotor connections of the rotor of the generator in a wye configuration during a first rotor speed operating range. Further, the method includes monitoring a rotor speed of the rotor of the generator. As such, the method also includes transitioning the rotor connections of the rotor from the wye configuration to a delta configuration if the rotor speed changes to a second rotor speed operating range.

In one embodiment, the first rotor speed operating range may include rotor speeds equal to and above a synchronous speed of the generator. For example, in certain embodiments, the first rotor speed operating range may include rotor speeds from about 1200 rotations per minute (RPM) to about 1600 RPM. In another embodiment, the second rotor speed operating range may include rotor speeds below the synchronous speed of the generator. For example, in such embodiments, the second rotor speed operating range may include rotor speeds from about 800 RPM to about 1200 RPM, such as from about 825 RPM to about 875 RPM.

In another embodiment, the method may include transitioning the rotor connections of the rotor from the wye configuration to the delta configuration while the electrical power circuit remains on-line. In further embodiments, the step of transitioning the rotor connections of the rotor from the wye configuration to the delta configuration is configured to increase an overall rotor speed operating range of the electrical power circuit. More specifically, for certain embodiments, for a 60-Hertz power converter, the overall rotor speed operating range may initially be from about 800 rotations per minute (RPM) to about 1600 RPM, whereas the increased overall rotor speed operating range may be from about 510 RPM to about 1600 RPM, more preferably from about 334 RPM to about 1600 RPM.

In additional embodiments, the method may further include monitoring the rotor speed of the rotor of the generator via one or more sensors. For example, in particular embodiments, the sensor(s) may include an RPM sensor or electric current or voltage sensors configured to generate one or more current or voltage feedback signals of the electrical power circuit. More specifically, in certain embodiments, the electric current or voltage feedback signals may include at least one of grid feedback signals, line-side converter feedback signals, rotor-side converter feedback signals, stator feedback signals, or similar. In yet another embodiment, the electrical power circuit may be part of a wind turbine power system.

In another aspect, the present subject matter is directed to a method for operating an electrical power circuit connected to a power grid. The electrical power circuit has a power converter electrically coupled to a generator having a rotor and a stator. The method includes monitoring a rotor speed of the rotor of the generator. The method also includes operating rotor connections of the rotor of the generator in a wye configuration during a first rotor speed operating range. In addition, the method includes operating the rotor connections of the rotor of the generator in a delta configuration during a low rotor speed operating range. It should be understood that the method may further include any of the additional steps and/or features as described herein.

In yet another aspect, the present subject matter is directed to an electrical power circuit. The electrical power circuit includes a generator having a rotor and a stator, a power converter having a line-side converter electrically coupled to a power grid and a rotor-side converter electrically coupled to the generator, and a controller communicatively coupled to at least one of the power converter and the generator. Further, the controller is configured to perform one or more operations, including but not limited to operating rotor connections of the rotor of the generator in a wye configuration during a first rotor speed operating range, monitoring a rotor speed of the rotor of the generator, and transitioning the rotor connections of the rotor from the wye configuration to a delta configuration if the rotor speed changes to a second rotor speed operating range. It should be understood that the electrical power circuit may be further configured with any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a portion of one embodiment of a wind turbine according to the present disclosure;

FIG. 2 illustrates a schematic view of one embodiment of an electrical and control system suitable for use with the wind turbine shown in FIG. 1;

FIG. 3 illustrates a block diagram of one embodiment of a controller suitable for use with the wind turbine shown in FIG. 1;

FIG. 4 illustrates a flow diagram of one embodiment of a method for operating an electrical power circuit connected to a power grid according to the present disclosure;

FIG. 5 illustrates a schematic diagram of one embodiment of rotor connections of a rotor of a generator of a wind turbine power system according to the present disclosure, particularly illustrating a wye configuration and delta configuration, respectively;

FIG. 6 illustrates a graph of one embodiment of rotor speed, rotor EMF frequency, and rotor slip (x-axis) versus rotor voltage $E_R$ (y-axis) according to the present disclosure;

FIG. 7 illustrates a graph of one embodiment of RPM hysteresis according to the present disclosure; and FIG. 8 illustrates a flow diagram of another embodiment of a method for operating a wind turbine connected to a power grid according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for operating an electrical power circuit e.g. a wind turbine power system, connected to a power grid so as to increase a rotor speed operating range thereof. Further, the electrical power circuit has a power converter electrically coupled to a generator having a rotor and a stator. Thus, the method includes operating rotor connections of the rotor of the generator in a wye configuration during a first rotor speed operating range. The method further includes monitoring a rotor speed of the rotor of the generator and transitioning the rotor connections of the rotor from the wye configuration to a delta configuration if the rotor speed changes to a second rotor speed operating range so as to increase the rotor speed operating range of the generator.

The present disclosure provides many advantages not present in the prior art. For example, increasing the operating range of the rotor speed of the generator can allow for an increased annualized energy production (AEP). Further, increasing the operating range of the rotor speed of the generator may also provide a reduction in the cost of electricity for renewable energy solutions as it can reduce the off-line/no production time periods and allow for more opportunities to harness the wind energy when operating at very low rotor speed levels.

Referring now to the drawings, FIG. 1 illustrates a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

In addition, the electrical and control system 200 may include a wind turbine controller 202 configured to control any of the components of the wind turbine 100. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, to facilitate the DFIG configuration, the generator rotor 122 has rotor connections 124 that are electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. In addition, the rotor filter 218 may include a rotor-side reactor. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. In addition, the line filter 224 may include a line-side reactor. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

In operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with the turbine controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical and control system 200 that facilitates operation of electrical and control system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 2), and/or any other suitable sensors.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art.

Thus, the converter controller 262 is configured to receive one or more voltage and/or electric current feedback signals from the sensors 252, 254, 256, 258. More specifically, in certain embodiments, the current or voltage feedback signals may include at least one of line current feedback signals, line-side converter feedback signals, rotor-side converter feedback signals, stator current feedback signals, line voltage feedback signals, or stator voltage feedback signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. Further, the converter controller 262 may be separate from or integral with the main controller 202. As such, the converter controller 262 is configured to implement the various method steps as described herein and may be configured similar to the turbine controller 202.

The maximum allowable instantaneous operating magnitude of the DC link 244 is determined by the design of the line-side and rotor-side converters 220, 222, including but not limited to selection of the power switching device types and ratings, selection of the DC link capacitance type and ratings, parasitic elements such as stray inductance and the operation of the gate drivers that govern the switching of the power devices and consequently the transient overshoot voltage seen by the power switching devices. Further, the steady state DC link operating voltage set point impacts a number of items including but not limited to the maximum magnitude of fundamental AC voltage available at the rotor and line side converters 220, 222, the semiconductor losses and the failure rate of the switching devices.

The maximum available fundamental output voltage at the rotor 122 and the line-side converter 222 is a function of the boost converter modulator design, the magnitude of the DC link voltage and the modulation index. Thus, if the power converter 210 uses a typical Space Vector Modulation (SVM), the voltage gain $V_G$ from the DC link 244 to either line to line output (line or rotor) without over-modulating is represented by Equation (1) below:

$$V_G = (1.15) * \frac{\sqrt{3}}{2} * \sqrt{2} \qquad \text{Equation (1)}$$

The rotor-side voltage of the rotor-side converter 220 may be calculated as a function of the stator voltage and frequency, a number of poles, rotor speed, machine impedance and turns ratio, and stator and rotor current. In order to maximize the operating voltage range of the generator 118, the steady state DC link operating voltage set point of the power converter 210 should be set as high as possible. Conversely, to obtain robustness in regards to grid voltage capability (e.g. high-voltage right through (HVRT) and islanding capability), a margin is required between the steady state DC link operating voltage set point and the maximum allowable instantaneous DC link voltage to avoid component failure, thereby necessitating a lower steady state DC link voltage set point. Minimizing the reliability effects of Single Event Burnout (SEB) and/or terrestrial cosmic radiation also calls for a minimization of the steady state DC link voltage set point.

In certain embodiments, it should be noted that operation of the DC Link voltage at the level required to meet the extreme ends of the extended operating rotor speed range is not required, nor is it desired. For example, when operating at speeds near the synchronous speed of the generator 118, the DC Link voltage set point can be reduced to a level dictated solely by peak value of the line-side voltage, plus some additional margin to allow for the forcing of current through the line-side or rotor-side inductors. By reducing the DC Link voltage set point when permitted by the operating RPM, the present disclosure reduces converter losses, provides an additional DC link voltage margin for HVRT events, and increases power switching device reliability.

Referring now to FIG. 4, a flow diagram of one embodiment of a method 350 for operating an electrical power system (e.g. the wind turbine power system of FIG. 2) is illustrated. As shown at 352, the method 350 includes operating the rotor connections 124 of the rotor 122 of the generator 118 in a wye configuration (FIG. 5) during a first rotor speed operating range. For example, as shown in the graph 300 of FIG. 6, the first rotor speed operating range may include rotor speeds equal to and above synchronous speed 302 of the wind turbine 100. More specifically, in certain embodiments, for a 60-Hertz power converter, the first rotor speed operating range may include rotor speeds from about 1200 rotations per minute (RPM) to about 1600 RPM. Further, FIG. 6 illustrates the limitations of the operating RPM based on the power converter 210 only being about to output a limited rotor voltage.

Referring still to FIG. 4, as shown at 354, the method 350 includes monitoring a rotor speed of the rotor 122 of the generator 118 during operation thereof, e.g. via one or more sensors 252, 254, 256, 258. For example, in particular embodiments, the sensor(s) 252, 254, 256, 258 may include electric current or voltage sensors configured to generate one or more current or voltage feedback signals of the electrical power circuit 200 as well as an RPM sensor in the drivetrain.

As shown at 356, the method 350 also includes transitioning the rotor connections of the rotor 122 from the wye configuration to a delta configuration if the rotor speed changes to a second rotor speed operating range. For example, as shown in the graph 300 of FIG. 6, the second rotor speed operating range may include rotor speeds below a synchronous speed 302 of the wind turbine 100. More specifically, in one embodiment, for a 60-Hertz power converter, the first rotor speed operating range may include from about 800 rotations per minute (RPM) to about 1200 RPM, such as from about 825 RPM to about 875 RPM, as shown in FIG. 7. It should be further understood that the second rotor speed operating range may also depend on various other factors, such as turns ratio of the generator 118 and/or a gear ratio of the gearbox 114, which must occur at an RPM/converter rotor frequency at or below a magnitude that allows the current of the power converter 210 to remain at or below its rating once the machine is connected into the delta configuration.

Referring now to FIG. 5, a schematic diagram of one embodiment of a wye-delta contactor configuration of the rotor connections 124 (FIG. 2) is illustrated according to the present disclosure. It should be understood that FIG. 5(A) illustrates the use of a conventional wye-delta motor starter inserted between the generator rotor 122 and the power converter 210, where one of the contactors (e.g. contactor 1M) for each phase is always closed. In alternative embodiments, as shown in FIG. 5(B), each phase of the wye-delta configuration may include a single contactor (i.e. contactor 2M) according to the present disclosure. More specifically, the top diagrams (FIGS. 5A and 5B) illustrate various embodiments of a wye-delta contactor configuration of the electrical power circuit 200, whereas FIGS. 5C and 5D illustrate the wye and delta configurations, respectively. Thus, as shown in the illustrated embodiment, to operate the rotor connections 124 of the rotor 122 of the generator 118 in a wye configuration (FIG. 5C), the 1M and S contactors are closed for the first rotor speed operating range. In contrast, to operate the rotor connections 124 of the rotor 122 of the generator 118 in a delta configuration (FIG. 5D), the 1M and 2M contactors are closed and the S contactors are open, e.g. during the second rotor speed operating range. As such, by transitioning the rotor connections of the rotor 122 from the wye configuration to the delta configuration at the bottom end of the RPM range (i.e. from about 800 RPM to about 1200 RPM, more preferably from about 825 RPM to about 875 RPM as shown in FIG. 7), an overall rotor speed operating range is increased for the electrical power circuit 200. For example, in certain embodiments, the increased overall rotor speed operating range may be larger than the initial operating range by about 15% to about 20%. Further, the transition from wye to delta is configured to increase the current seen by the power converter 210 by the square-root of 3; however, the power converter 210 is able to operate at this level of load current. In addition, as shown in FIG. 7, the transition from the wye configuration to the delta configuration and vice versa can include RPM hysteresis in the controller 202 to avoid excessive transitioning, i.e. the transition should occur quickly.

In additional embodiments, during the transition from the wye configuration to the delta configuration, any one or more of the following conditions may occur: the generator stator 120 may remain connected, the torque may be ramped to zero, the power converter rotor IGBTs may stop gating, the contactor S may be dropped out, the contactor 2M may be pulled in, the rotor converter output voltage may be synched to the rotor voltage, the rotor IGBTs may be enabled, and/or the torque may be ramped up. Further, during the time this process is occurring, the rotor blade speed increases as the energy from the wind has no energy sink, so the time allotted to make the transition must be short enough to avoid an excessive level of blade RPM increase. Thus, as shown in FIG. 7, the minimum level of RPM hysteresis is determined by the time required to carry out the above process and the related analysis of the speed increase that can be expected during this time period.

In further embodiments, during the transition from the delta configuration to the wye configuration, any one or more of the following conditions may occur: the generator stator 120 may remain connected, the torque may be ramped to zero, the converter rotor IGBTs may stop gating, the contactor 2M may be dropped out, the contactor S may be pulled in, the rotor converter output voltage may be synched to the rotor voltage, the rotor IGBTs may be enabled, and/or the torque may be ramped up.

More specifically, in particular embodiments, for a 60-Hertz power converter, the overall rotor speed operating range, before transitioning from the wye configurations to the delta configuration, may include rotor speeds from about 800 rotations per minute (RPM) to about 1600 RPM. As such, in certain embodiments, the switchover may increase the overall rotor speed operating range from about 800 RPM-1600 RPM to about 659 RPM-1600 RPM, more preferably from about 510 RPM-1600 RPM, and still more preferably from about 334 RPM-1600 RPM. More specifically, where the DC Link voltage of the power converter 210 is limited to approximately 1051V, the overall rotor speed operating range may be increased from 800 RPM-1600 RPM to about 510 RPM-1600 RPM, depending on the system design, machine turns ratio, gearbox ratio, etc.). In addition, where the DC link 244 is permitted to increase to 1300V at both ends of the RPM range (i.e. the upper and lower range), the overall rotor speed operating range may be increased from 800 RPM-1600 RPM to about 334 RPM-1600 RPM, again, depending on the system design, machine turns ratio, gearbox ratio. etc.

For certain embodiments, transitioning from the wye configuration to the delta configuration can be accomplished in a short time frame, e.g. from about 0.1 seconds to about 1 second, such as about 0.5 seconds, without the concern for over-speed issues. More specifically, in certain embodiments, to prevent over-speed conditions, the system 200 remains on-line with power generation being interrupted until the switchover is complete by providing for switchover to occur at the low end of the operating RPM range of the wind turbine, turning off the power converter 210, maintaining the stator 120 in an energized state, and/or sensing the rotor back electromotive force (EMF) voltage for line-side converter synchronization once the switchover from the wye configuration to the delta configuration (or vice versa) is accomplished.

Referring now to FIG. 8, a flow diagram of another embodiment of a method 400 for operating an electrical power circuit connected to a power grid (e.g. the wind turbine system 100 of FIG. 2) is illustrated. Thus, as shown at 402, the method 400 includes monitoring a rotor speed of the rotor of the generator 118. As shown at 404, the method 400 also includes operating rotor connections of the rotor 122 of the generator 118 in a wye configuration during a first rotor speed operating range. In addition, as shown at 406, the method 400 includes operating the rotor connections of the rotor 122 of the generator 118 in a delta configuration during a low rotor speed operating range. It should be understood that the method may further include any of the additional steps and/or features as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an electrical power circuit connected to a power grid, the electrical power circuit having a power converter comprising a DC link, the power converter electrically coupled to a generator having a rotor and a stator, the method comprising:
    operating rotor connections of the rotor of the generator in a wye configuration during a first rotor speed operating range, the first rotor speed operating range comprising rotor speeds equal to and above a synchronous speed of the generator;
    monitoring a rotor speed of the rotor of the generator; and,
    transitioning the rotor connections of the rotor from the wye configuration to a delta configuration if the rotor speed changes to a second rotor speed operating range, the second rotor speed operating range comprising rotor speeds below the synchronous speed of the generator,
    wherein transitioning from the wye configuration to the delta configuration and vice versa comprises rotor speed hysteresis to avoid excessive transitioning.

2. The method of claim 1, further comprising transitioning the rotor connections of the rotor from the wye configuration to the delta configuration while the electrical power circuit remains on-line.

3. The method of claim 1, wherein transitioning the rotor connections of the rotor from the wye configuration to the delta configuration increases an overall rotor speed operating range of the electrical power circuit.

4. The method of claim 3, wherein, for a 60-Hertz power converter, the overall rotor speed operating range comprises from about 800 rotations per minute (RPM) to about 1600 RPM and the increased overall rotor speed operating range comprises from about 334 RPM to about 1600 RPM.

5. The method of claim 1, further comprising monitoring the rotor speed of the rotor of the generator via one or more sensors.

6. The method of claim 5, wherein the one or more sensors comprise at least one of an RPM sensor or electric current or voltage sensors configured to generate one or more current or voltage feedback signals of the electrical power circuit.

7. The method of claim 6, wherein the electric current or voltage feedback signals comprise at least one of grid feedback signals, line-side converter feedback signals, rotor-side converter feedback signals, or stator feedback signals.

8. The method of claim 1, wherein the electrical power circuit is part of a wind turbine power system.

9. The method of claim 1, further comprising reducing a DC link voltage set point of the DC link to a level dictated by a peak value of a line-side voltage of the line-side converter plus an additional margin when operating at speeds below the synchronous speed of the generator to allow for forcing of current through a line-side inductor of the line-side converter or a rotor-side inductor of the rotor-side converter.

10. An electrical power circuit, comprising:
    a generator having a rotor and a stator;
    a power converter comprising a line-side converter electrically coupled to a power grid and a rotor-side converter electrically coupled to the generator the line-side converter electrically coupled to the rotor-side converter via a DC link; and,
    a controller communicatively coupled to at least one of the power converter and the generator, the controller configured to perform one or more operations, the operations comprising:
        operating rotor connections of the rotor of the generator in a wye configuration during a first rotor speed operating range, the first rotor speed operating range comprising rotor speeds equal to and above a synchronous speed of the generator;
        monitoring a rotor speed of the rotor of the generator; and,
        transitioning the rotor connections of the rotor from the wye configuration to a delta configuration if the rotor speed changes to a second rotor speed operating range, the second rotor speed operating range comprising rotor speeds below the synchronous speed of the generator,
        wherein transitioning from the wve configuration to the delta configuration and vice versa comprises rotor speed hysteresis to avoid excessive transitioning.

11. The electrical power circuit of claim 10, wherein the one or more operations further comprise transitioning the rotor connections of the rotor from the wye configuration to the delta configuration while the electrical power circuit remains on-line.

12. The electrical power circuit of claim 10, wherein transitioning the rotor connections of the rotor from the wye configuration to the delta configuration increases an overall rotor speed operating range of the electrical power circuit.

13. The electrical power circuit of claim 12, wherein, for a 60-Hertz power converter, the overall rotor speed operating range comprises from about 800 rotations per minute (RPM) to about 1600 RPM and the increased overall rotor speed operating range comprises from about 334 RPM to about 1600 RPM.

14. The electrical power circuit of claim 10, wherein the one or more operations further comprise monitoring the rotor speed of the rotor of the generator via one or more sensors, wherein the one or more sensors comprises electric current or voltage sensors configured to generate one or more current or voltage feedback signals of the electrical power circuit.

15. The electrical power circuit of claim 14, wherein the electric current or voltage feedback signals comprise at least one of grid feedback signals, line-side converter feedback signals, rotor-side converter feedback signals, or stator feedback signals.

16. The electrical power circuit of claim 10, wherein the electrical power circuit is part of a wind turbine power system.

17. The electrical power circuit of claim 10, wherein the one or more operations further comprise reducing a DC link voltage set point of the DC link to a level dictated by a peak value of a line-side voltage of the line-side converter plus an additional margin when operating at speeds below the synchronous speed of the generator to allow for forcing of current through a line-side inductor of the line-side converter or a rotor-side inductor of the rotor-side converter.

\* \* \* \* \*